(12) United States Patent
Hatambeiki et al.

(10) Patent No.: US 12,498,794 B2
(45) Date of Patent: Dec. 16, 2025

(54) SYSTEM AND METHOD FOR MULTI-MODE COMMAND INPUT

(71) Applicant: Universal Electronics Inc., Scottsdale, AZ (US)

(72) Inventors: Arsham Hatambeiki, Scottsdale, AZ (US); Jeffrey Kohanek, Westminster, CA (US); Pamela Eichler Keiles, Long Beach, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 17/737,524

(22) Filed: May 5, 2022

(65) Prior Publication Data

US 2022/0261089 A1 Aug. 18, 2022

Related U.S. Application Data

(63) Continuation of application No. 16/279,095, filed on Feb. 19, 2019, which is a continuation of application
(Continued)

(51) Int. Cl.
*G06F 3/02* (2006.01)
*G06F 3/0354* (2013.01)
(Continued)

(52) U.S. Cl.
CPC ........ *G06F 3/0219* (2013.01); *G06F 3/03547* (2013.01); *G06F 3/041* (2013.01); *G06F 3/0414* (2013.01); *H01H 9/0235* (2013.01); *H01H 25/041* (2013.01); *G06F 3/0447* (2019.05); *G06F 2203/04106* (2013.01)

(58) Field of Classification Search
CPC .......... G06F 3/041; G06F 3/042; G06F 3/044; G06F 3/0219; G06F 3/03547; G06F 3/0414; G06F 3/0447; G06F 2203/04106; H01H 9/0235; H01H 25/041; G09G 5/00
See application file for complete search history.

(56) References Cited

U.S. PATENT DOCUMENTS 6,390,699 B1  5/2002  Lam
6,507,306 B1  1/2003  Griesau
(Continued)

FOREIGN PATENT DOCUMENTS

CN  1926604 A  3/2007

OTHER PUBLICATIONS

European Patent Office, examination report issued on European patent application No. 10840048.2, dated Feb. 7, 2018, 7 pgs.
(Continued)

*Primary Examiner* — Chanh D Nguyen
*Assistant Examiner* — Nguyen H Truong
(74) *Attorney, Agent, or Firm* — Greenberg Traurig, LLP

(57) ABSTRACT

A controlling device has a moveable touch sensitive panel positioned above a plurality of switches. When the controlling device senses an activation of at least one of the plurality of switches when caused by a movement of the touch sensitive panel resulting from an input at an input location upon the touch sensitive surface, the controlling device responds by transmitting a signal to an appliance wherein the signal is reflective of the input location upon the touch sensitive surface.

5 Claims, 7 Drawing Sheets

Related U.S. Application Data

No. 15/902,007, filed on Feb. 22, 2018, now abandoned, which is a continuation of application No. 12/645,037, filed on Dec. 22, 2009.

(51) Int. Cl.
*G06F 3/041* (2006.01)
*H01H 9/02* (2006.01)
*H01H 25/04* (2006.01)
*G06F 3/044* (2006.01)

(56) References Cited

U.S. PATENT DOCUMENTS

| | | |
|---|---|---|
| 6,765,557 B1 | 7/2004 | Segal |
| 7,460,050 B2 | 12/2008 | Alvarado et al. |
| 8,059,105 B2 | 11/2011 | Rosenberg et al. |
| 8,330,639 B2 | 12/2012 | Wong et al. |
| 2004/0070491 A1 | 4/2004 | Huang |
| 2004/0196270 A1 | 10/2004 | Chiu et al. |
| 2004/0207765 A1 | 10/2004 | Ku et al. |
| 2005/0052425 A1 | 3/2005 | Zadesky et al. |
| 2005/0066370 A1 | 3/2005 | Alvarado |
| 2005/0162282 A1 | 7/2005 | Dresti et al. |
| 2005/0200598 A1 | 9/2005 | Hayes et al. |
| 2006/0028454 A1 | 2/2006 | Branton et al. |
| 2006/0250377 A1 | 11/2006 | Zadesky |
| 2007/0080933 A1* | 4/2007 | Chen ............... G06F 3/021 345/156 |
| 2007/0126703 A1* | 6/2007 | Griffin ............. G06F 3/0362 345/169 |
| 2007/0126714 A1* | 6/2007 | Imamura .......... G06F 3/038 345/173 |
| 2007/0129046 A1 | 6/2007 | Soh et al. |
| 2007/0135104 A1* | 6/2007 | Suzuki ............. G06F 3/0236 455/414.1 |
| 2007/0152983 A1 | 7/2007 | McKillop et al. |
| 2007/0158173 A1* | 7/2007 | Barnado ........... H01H 13/70 200/512 |
| 2007/0257821 A1 | 11/2007 | Son |
| 2008/0005764 A1 | 1/2008 | Arling et al. |
| 2008/0079604 A1 | 4/2008 | Madonna et al. |
| 2008/0111788 A1 | 5/2008 | Rosenberg et al. |
| 2008/0235406 A1 | 9/2008 | Meijer et al. |
| 2008/0257707 A1 | 10/2008 | Murase et al. |
| 2009/0109183 A1 | 4/2009 | Carvajal et al. |
| 2009/0207040 A1 | 8/2009 | Nakamura |
| 2009/0207148 A1 | 8/2009 | Sugimoto |
| 2009/0229892 A1 | 9/2009 | Fisher et al. |
| 2009/0237374 A1 | 9/2009 | Li |
| 2009/0262073 A1 | 10/2009 | Rigazio et al. |
| 2009/0262090 A1* | 10/2009 | Oh .................. G06F 3/04883 345/173 |
| 2009/0273573 A1 | 11/2009 | Hotelling |
| 2010/0099463 A1* | 4/2010 | Kim ................ G06F 3/0233 455/566 |
| 2010/0139990 A1 | 6/2010 | Westerman et al. |
| 2010/0148995 A1 | 6/2010 | Elias |
| 2010/0149127 A1 | 6/2010 | Fisher et al. |
| 2010/0164880 A1 | 7/2010 | Huang |
| 2010/0164897 A1 | 7/2010 | Morin et al. |
| 2010/0201615 A1* | 8/2010 | Tupman ........... G06F 1/1626 345/156 |
| 2010/0220065 A1 | 9/2010 | Ma |
| 2011/0095988 A1 | 4/2011 | Singhal |
| 2011/0148762 A1 | 6/2011 | Hatambeiki |

OTHER PUBLICATIONS

The Int. Bureau of WIPO, International Preliminary Report on Patentability of PCT Application No. US10/61438, Mailed Jul. 5, 2012, 7 pgs.
State Intellectual Property Office of the People's Republic of China, Office Action issued on Chinese patent application No. 201080058528.4, dated Mar. 18, 2015, 9 pgs.
European Patent Office, extended European search report issued on EP patent application No. 10840048.2, dated Feb. 5, 2016, 9 pgs.
State Intellectual Property Office of the People's Republic of China, Office Action issued on Chinese patent application No. 201080058528.4, dated Sep. 22, 2015, 14 pgs.
U.S. Patent Office, Non-Final Office Action issued on U.S. Appl. No. 15/902,007, dated Apr. 2, 2018, 11 pgs.
U.S. Patent Office, Non-Final Office Action issued on U.S. Appl. No. 12/645,037, dated Dec. 17, 2019, 16 pgs.
U.S. Patent Office, Final Office Action issued on U.S. Appl. No. 12/645,037, dated Mar. 13, 2020, 16 pgs.
EPO, extended European search report issued on European patent application No. 20154656.1, dated Feb. 28, 2020, 6 pgs.
EPO, extended European search report issued on European patent application No. 20154653.8, dated Feb. 28, 2020, 7 pgs.
Brazilian Patent Office, office action issued on Brazilian patent application No. BR1120120154052, received Sep. 9, 2020, 2 pages.
USPTO, Non-Final Office Action issued on U.S. Appl. No. 15/902,007, dated Sep. 17, 2020, 41 pgs.
European Patent Office, office action issued on European patent application No. 20154653.8, dated Feb. 12, 2021, 5 pgs.
U.S. Patent Office, Final Office Action issued on U.S. Appl. No. 16/279,095, dated Mar. 5, 2020, 14 pgs.
U.S. Patent Office, Non-Final Office Action issued on U.S. Appl. No. 16/279,095, dated Sep. 27, 2019, 12 pgs.
U.S. Patent and Trademark Office, Non-Final Office Action issued on U.S. Appl. No. 17/737,664, dated Nov. 9, 2022, 6 pgs.
U.S. Patent and Trademark Office, Final Office Action issued in U.S. Appl. No. 17/737,664, dated Feb. 28, 2023, 18 pgs.
U.S. Patent and Trademark Office, Non-Final Office Action issued in U.S. Appl. No. 17/955,756, dated Apr. 27, 2023, 22 pgs.
Non-final Office Action from U.S. Appl. No. 17/955,756, dated Aug. 18, 2025, 13 pp.

* cited by examiner

SYSTEM AND METHOD FOR MULTI-MODE COMMAND INPUT

RELATED APPLICATION INFORMATION

This application claims the benefit of and is a continuation of U.S. application Ser. No. 16/279,095, filed on Feb. 19, 2019, which application claims the benefit of and is a continuation of U.S. application Ser. No. 15/902,007, filed on Feb. 22, 2018, which application claims the benefit of and is a continuation of U.S. application Ser. No. 12/645,037, filed on Dec. 22, 2009, the disclosures of which are incorporated herein by reference in its entirety.

BACKGROUND

Controlling devices for use in issuing commands to entertainment and other appliances, for example remote controls, and the features and functionality provided by such controlling devices are well known in the art. Traditionally, user input means on such controlling devices has comprised a series of buttons each of which may result in the transmission of a specific command when activated. Increasingly in today's environment, such controlling devices must be used to interact with displayed menu systems, browse web pages, manipulate pointers, and perform other similar activities which may require directional control input, e.g., to scroll displayed information on a screen, to move a pointer, to control a game activity or avatar, to zoom in or out, to control functions such as fast forward or slow motion, or the like (such activities collectively referred to hereinafter as "navigation"). Although certain navigation functions may be performed using conventional controlling device input mechanisms, such as a group of up, down, left, and right arrow keys, in many instances the user experience may be improved by the provision of an input mechanism which is better suited to this type of activity. Additionally, multi-functional use of this input mechanism may further improve user experience by reducing the number of keys or buttons on a controlling device.

SUMMARY

The following generally describes a system and method for providing improved user input functionality on a controlling device. To this end, in addition to a conventional key matrix for receiving button inputs as is well known in the art, a controlling device may be provided with input means such as for example a resistive or capacitive touch sensor, etc., whereby motion and/or pressure by a user's finger may be translated into navigation commands to be transmitted to a target controlled device. These commands may be applied at the target device to control operations such as scrolling a menu, movement of a cursor on the screen, motion of a game object, etc., as appropriate for a particular application. Furthermore, in addition to, or when not required for, the performance of navigation functions, the touch sensitive input means may be adapted to provide for conventional keypress input operations, such as for example without limitation a numeric keypad in an illustrative embodiment.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
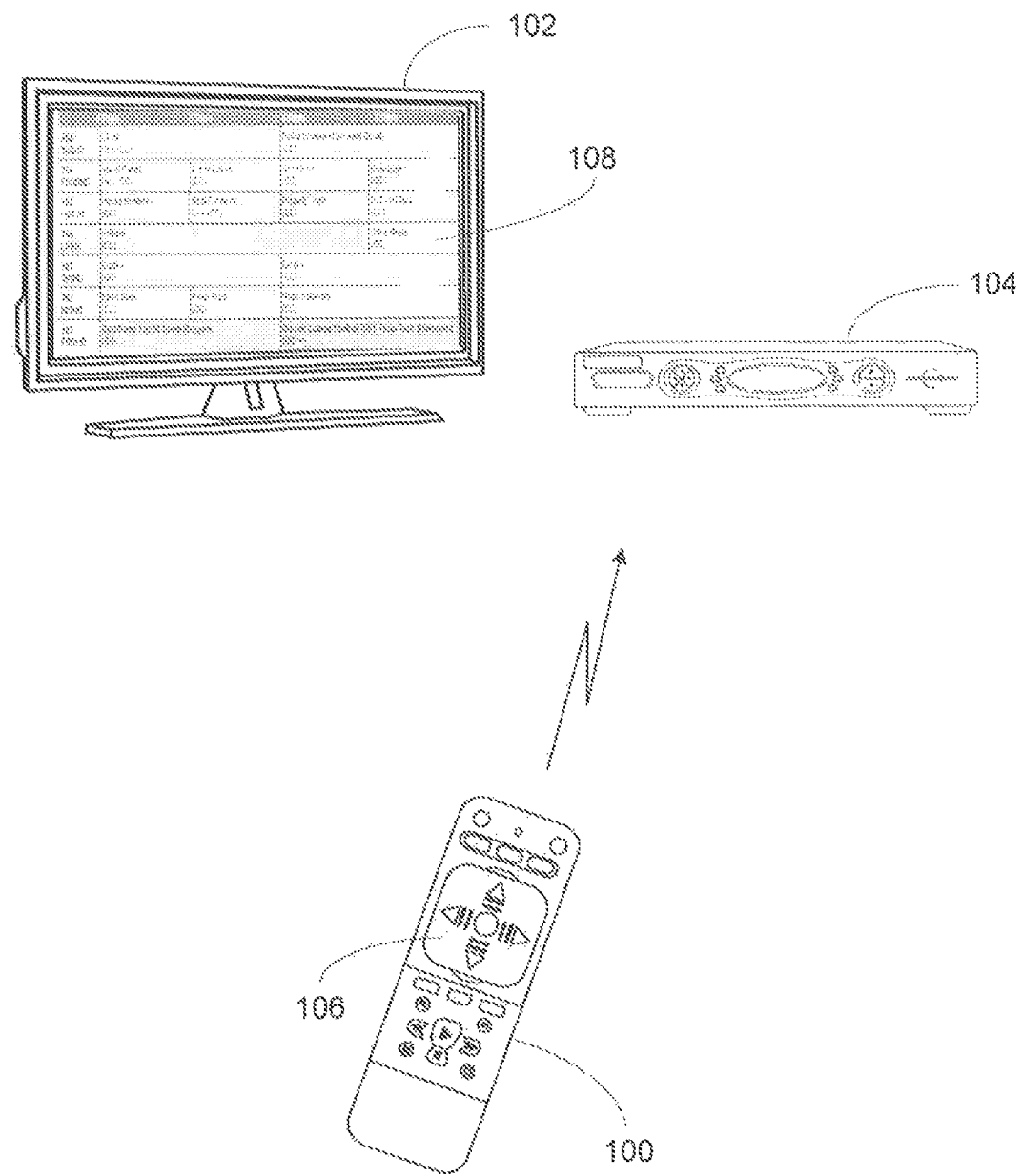
FIG. 1 illustrates an exemplary system in which an exemplary controlling device according to the instant invention may be used.

Turning now to FIG. 1, there is illustrated an exemplary system in which a controlling device 100 is configured to control various controllable appliances, such as for example a television 102 and a set top box ("STB") 104. As is known in the art, the controlling device 100 may be capable of transmitting commands to the appliances, using any convenient IR, RF, Point-to-Point, or networked protocol, to cause the appliances to perform operational functions. While illustrated in the context of a television 102 and STB 104, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. In a particular illustrative embodiment, in addition to conventional control functionality as is well know in the art, controlling device 100 may further include an input area 106 for generation of navigation commands for transmission from the controlling device 100 to one or more appliances in response to user interaction with that area, used for example to scroll a program guide menu display 108 on TV 102 by issuing a series of commands to set top box 104. Additionally, in the exemplary embodiment, input area 106 may be further adapted to offer keypad-like functionality during certain modes of operation, all as will be described in further detail hereafter.

Figure 2:
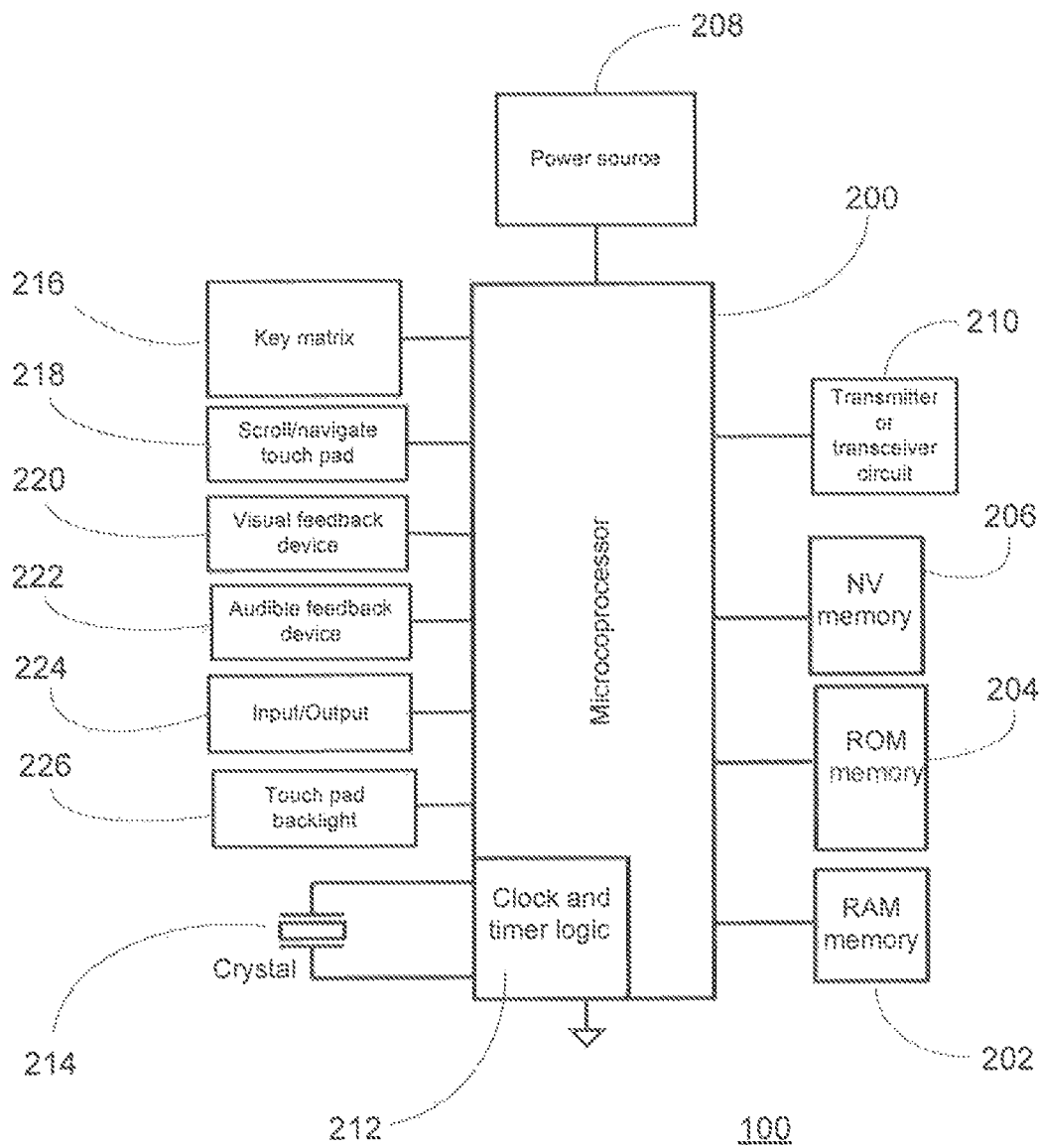
FIG. 2 illustrates a block diagram of exemplary components of the exemplary controlling device of FIG. 1.

With reference to FIG. 2, for use in commanding the functional operations of one or more appliances, the controlling device 100 may include, as needed for a particular application, a processor 200 coupled to a ROM memory 204; a RAM memory 202; a key matrix 216 (e.g., hard keys, soft keys such as a touch sensitive surface overlaid on a liquid crystal (LCD), and/or an electroluminescent (EL) display); a scrolling and/or navigation function input means 218 such as a capacitive or resistive touch sensor; transmission circuit(s) and/or transceiver circuit(s) 210 (e.g., IR and/or RF); a non-volatile read/write memory 206; a means 220 to provide visual feedback to the user (e.g., one or more LEDs, display, and/or the like); a means 222 to provide audible feedback to a user (e.g., a speaker, piezoelectric buzzer, etc.); a power source 208; an input/output port 224 such as a serial interface, USB port, modem, Zigbee, WiFi, or Bluetooth transceiver, etc.; one or more means 226 for backlighting areas of touchpad 218 and/or key matrix 216; and clock and timer logic 212 with associated crystal or resonator 214.

As will be understood by those skilled in the art, some or all of the memories 202, 204, 206 may include executable instructions (collectively, the program memory) that are intended to be executed by the processor 200 to control the operation of the remote control 100, as well as data which serves to define to the operational software the necessary control protocols and command values for use in transmitting command signals to controllable appliances (collectively, the command data). In this manner, the processor 200 may be programmed to control the various electronic components within the remote control 100, e.g., to monitor the key matrix 216, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the memories 202, 204 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 may be adapted to be responsive to events, such as a sensed user interaction with the key matrix 216, touchpad 218, etc. In response to an event, appropriate instructions within the program memory (hereafter the "operating program") may be executed. For example, when a function key is actuated on the controlling device 100, the controlling device 100 may retrieve from the command data stored in memory 202, 204, 206 a command value and control protocol corresponding to the actuated function key and, where necessary, current device mode, and will use the retrieved command data to transmit to an intended target appliance, e.g., STB 104, a command in a format recognizable by that appliance to thereby control one or more functional operations of that appliance. It will be appreciated that the operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

In some embodiments, controlling device 100 may be the universal type, that is provisioned with a library comprising a multiplicity of command codes and protocols suitable for controlling various appliances. In such cases, for selecting sets of command data to be associated with the specific appliances to be controlled (hereafter referred to as a setup procedure), data may be entered into the controlling device 100 that serves to identify each intended target appliance by its make, and/or model, and/or type. The data may typically be entered via activation of those keys that are also used to cause the transmission of commands to an appliance, preferably the keys that are labeled with numerals. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data set may take the form of a numeric setup code (obtained, for example, from a printed list of manufacturer names and/or models with corresponding code numbers, from a support Web site, etc.). Alternative setup procedures known in the art include scanning bar codes, sequentially transmitting a predetermined command in different formats until a target appliance response is detected, interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938 all of like assignee and incorporated herein by reference in their entirety.

In keeping with the teachings of this invention, controlling device 100 may include input means for accepting user touch input to be translated into navigation commands. In an exemplary embodiment, input means 218 may take the form of a multiple-electrode capacitive touch sensor. In this form, input means 218 may accept finger sliding gestures on either axis for translation into navigation step commands in an X or Y direction, as well as finger pressure at, for example, the cardinal points and center area for translation into discrete commands, for example equivalent to a conventional keypad's four arrow keys and a select key, all as will be described in further detail hereafter.

Figure 3:
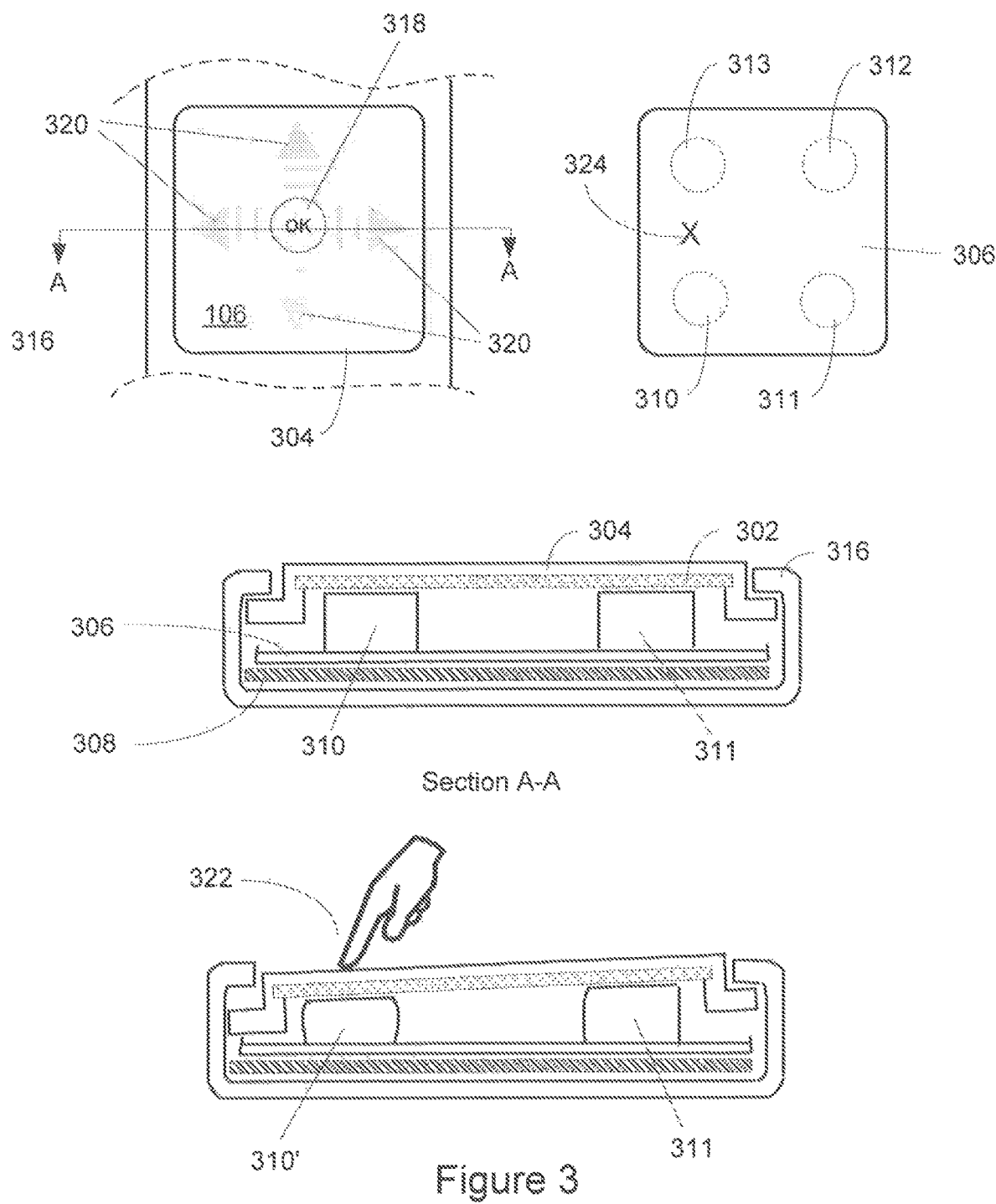
FIG. 3 illustrates the structure and operation of an exemplary touch sensitive input area of the exemplary controlling device of FIG. 1.

Turning to FIG. 3, the construction of an exemplary navigation input means 218, which may comprise area 106 of exemplary controlling device 100, will now be discussed in detail. Such an input means may comprise the before-mentioned multiple-electrode capacitive touch sensor 302 and an associated acrylic keycap 304, positioned upon a group of conventional silicon rubber keypad buttons 310, 311, 312, 313 (hereafter a "floating touch sensor"). Silicon rubber keypad 306 and buttons 310 through 313, which may comprise a portion of key matrix 216 as well known in the art, may be supported by printed circuit board 308 and may serve to hold touch input assembly 302,304 elevated and flush with an associated opening formed in the upper casing 316 of controlling device 100. In an exemplary embodiment the surface of acrylic keycap 304 covering touch sensor 302 may include indicia which provide cues to the functionality of input means 106, which indicia may be embossed or engraved 320 or printed 318 upon the keycap surface. In certain embodiments additional indicia may also be present on acrylic keycap 304, which additional indicia may be illuminated or otherwise brought into prominence during certain modes of operation, as will be described in further detail hereafter.

In a first input mode, a user may slide a finger across the surface of the touch surface, e.g., keycap 304, to cause navigation command output, for example as described in co-pending U.S. patent application Ser. No. 12/552,761, of like assignee and incorporated herein by reference in its entirety. Such navigation step commands resulting from finger sliding gestures may be reported to a target appliance using any convenient transmission protocol, IR or RF, as known in the art. In general, such reports may include information representative of both direction and speed of the input gesture. Since exemplary gesture interpretation and reporting techniques are presented in the above referenced '761 application, for the sake of brevity these will not be repeated herein.

In a second input mode, which may be used in conjunction with or separately from finger slide input, a user may press downwards 322 anywhere upon the touch surface, e.g., acrylic keycap 304. As illustrated, this will result in compression of one or more of the underlying silicon rubber buttons 310 through 313, for example button 310' as shown in FIG. 3. As in a conventional keypad, compression of such a button may cause a conductive contact area on the underside of said button to complete an electrical circuit provided for that purpose on printed circuit board 308, i.e., cause a key press event to be detected by the operating program of controlling device 100. In this instance however, the actuation of any one or more of silicon rubber buttons 310 through 313 may be interpreted by the operating program of controlling device 100 simply as a general signal that the touch pad input area 106 has received a finger press. The actual significance of the event and the command to be issued may then be determined by the operating program of controlling device 100 based on the position of the user's finger as reported by touch sensor 302 at the time the electrical circuit was completed.

By way of further example, if conventional keypress decoding based only on the status of silicon rubber buttons 310 through 313 were to be employed in this example and user finger pressure was applied at location 324, it will be appreciated that the circuits associated with either or both of buttons 310 and 313 may be completed individually or collectively in either order and within a short time of one another, which may lead to uncertainty as to the exact location of the actuating finger. Likewise, considering for a moment an alternate embodiment in which the silicon buttons are dispensed with and the touch input pad fixedly mounted in the controlling device casing, the decoding function of the controlling device operating program may in this instance be required to distinguish between a finger tap action and the commencement or termination of a finger slide action. Accordingly, it will be appreciated that in the exemplary embodiment presented, advantageously finger press detection and finger position detection are performed separately in the manner described above, which may result in a more robust and reliable overall detection mechanism. Further, the provision of keypad elements as part of such a floating touch sensor may also result in improved user tactile feedback.

Figure 4:
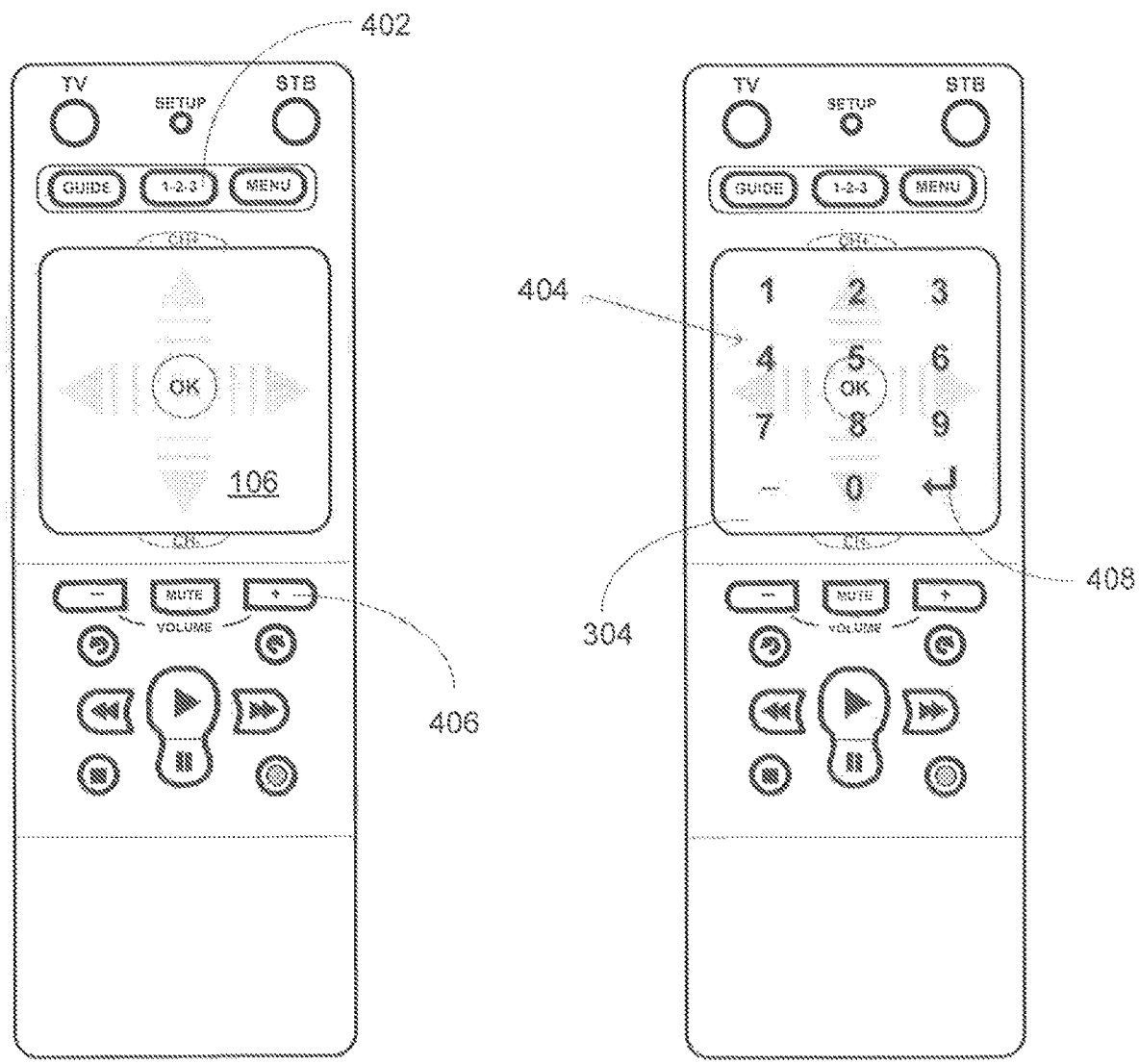
FIG. 4 illustrates multiple modes of operation of the exemplary controlling device of FIG. 1.

Certain embodiments of controlling device 100 may support multiple modes of operation of touch input area 106. By way of example, with reference to FIG. 4, in an exemplary embodiment the operation of touch input area 106 of controlling device 100 may be user switchable between navigation mode and digit entry mode, for example via a "numeric" toggle button 402, labeled "1-2-3" in the illustrative example. When in the navigation mode, user finger swipes and presses on touch input area 106 may be interpreted by the operating program of controlling device 100 as requests to issue navigation commands as described previously. However, when toggled into digit entry mode by activation of button 402, interpretation of touch area input by the operating program of controlling device 100 may change to a represent a twelve-key numeric input pad, with only finger press input recognized. In some embodiments the appearance of touch input pad 106, in particular that of acrylic keycap 304, may be altered to signal this mode of operation to a user, as illustrated at 404. Such a change in appearance may be effected, for example, by illumination via backlight of digit indicia laser etched into the surface of acrylic keycap 304. Illumination may be achieved by one or more LEDs directed towards the edge of keycap 304, i.e., using the acrylic material as a light pipe; by conventional backlighting using one or more LEDs mounted on the surface of capacitive touch sensor 302; or any other means as appropriate for a particular embodiment. Without limitation, an example of such an illuminable interface is described in commonly assigned, published application no. 2006/0283697.

Figure 5:
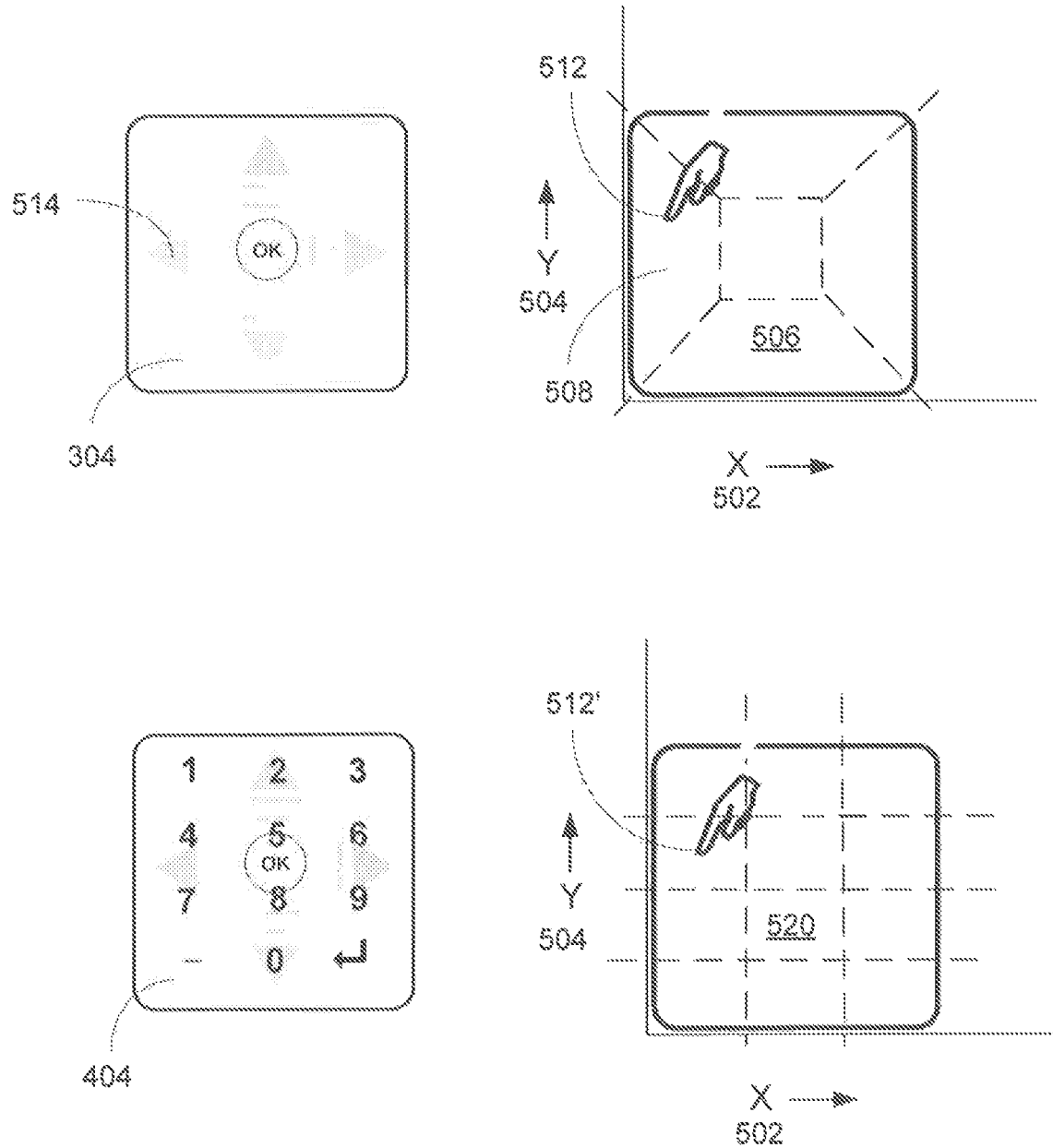
FIG. 5 illustrates exemplary interpretations of user input interactions with a touch sensitive area of the exemplary controlling device of FIG. 4.

Turning now to FIG. 5, when exemplary controlling device 100 is functioning in the normal (i.e., navigation) mode, upon actuation of one or more of the keypad keys 310 through 313 associated with navigation pad 106 the operating program of controlling device 100 may retrieve the current finger position coordinates "X" 502 and "Y" 504 and translate these values into a command request based upon which one of five zones 506 the X,Y coordinates are determined to fall within. By way of example, a finger press at the indicated location 512 may be interpreted as occurring within zone 508 which corresponds in this example to the "left arrow" navigation indicia 514, and the corresponding navigation command issued to the target appliance. In contrast, in an illustrative embodiment, when exemplary controlling device 100 is functioning in a digit entry mode as a result of actuation of "1-2-3" button 402 the retrieved X,Y coordinates may be interpreted by the operating program of controlling device 100 according to a twelve zone schema 520, each zone now corresponding to one of the digits "0" through "9" together with an "Enter" and a "Separator" functions. By way of further example, when functioning in this mode the operating program of controlling device 100 may interpret a finger press at location 512' to correspond to the numeric digit "4", and the corresponding numeric digit command issued to the target appliance.

Figure 6:
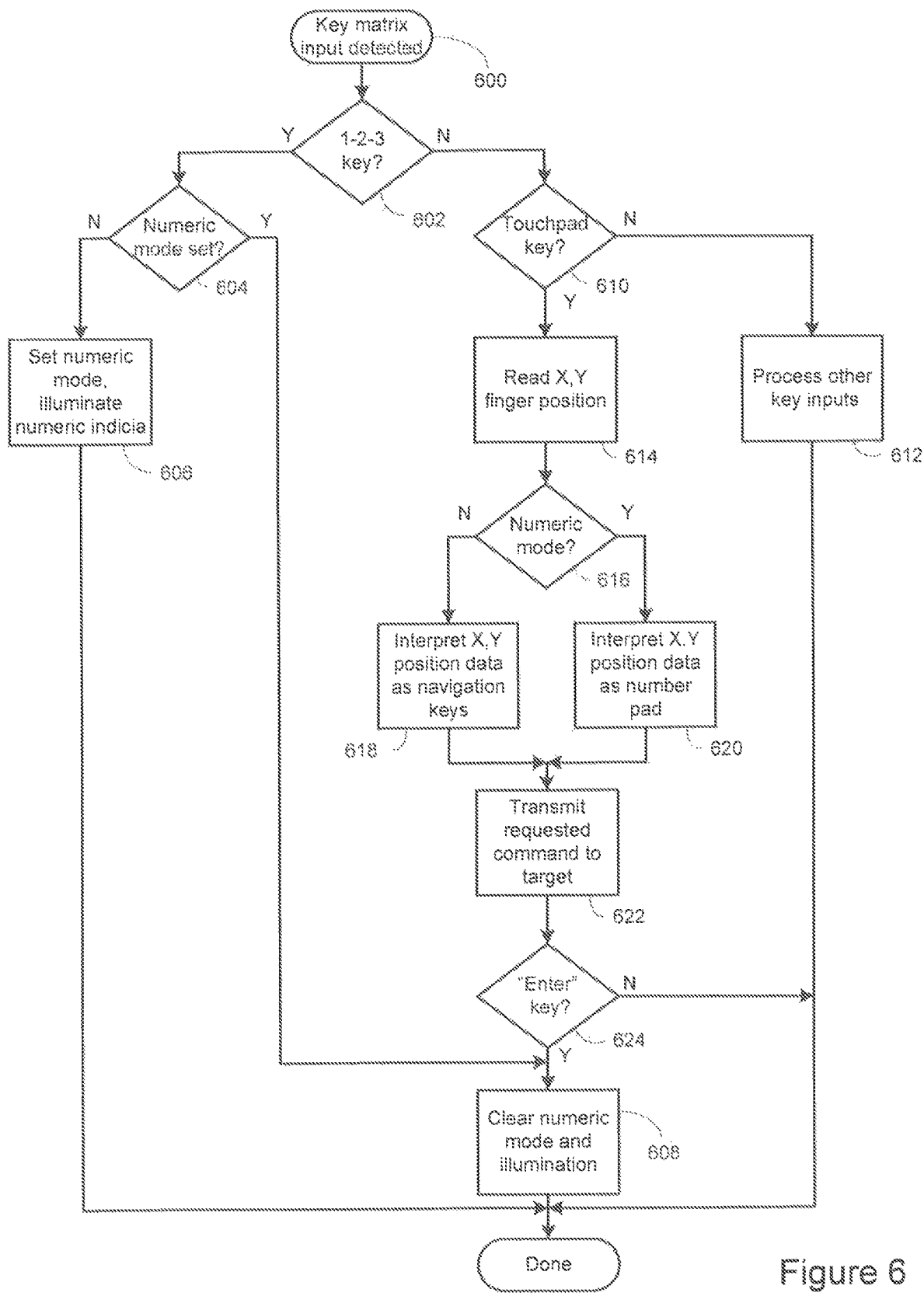
FIG. 6 illustrates in flow chart form an exemplary method for performing the interpretations illustrated in FIG. 5.

By way of more detailed example, the flowchart of FIG. 6 in conjunction with Tables 1 and 2 present an exemplary method for processing and interpreting user interactions which may be implemented by the operating program of controlling device 100. Turning to FIG. 6, upon detection of key matrix input 600 by the operating program of controlling device 100, it may be first determined at step 602 if the actuated key is the "1-2-3" digit entry toggle button 402. If so, at step 604 it may be next determined if controlling device is already functioning in the numeric entry mode. If not, at step 606 numeric mode operation status is set to "true" and numeric indicia 404 illuminated as described earlier. If however, the device is already functioning in the numeric entry mode, then actuation of button 402 may be interpreted a request to exit this mode and return to the navigation mode of operation, which is performed at step 608.

If the actuated key is not the "1-2-3" button, at step 610 the operating program of controlling device 100 may next determine if the actuated key is one of the group 310 through 313 associated with touch sensor assembly 302, 304. If not, the key input may represent a conventional button, for example "volume up" 406, and is processed at step 612. Since such conventional key decoding and command output are well known in the art, for the sake of brevity this aspect of controlling device 100 and associated operating program will not be discussed further herein.

If however, the operating program of controlling device 100 determines that the actuated key is one or more of the group 310 through 313, at step 614 the "X" and "Y" coordinates of the user's actuating finger position may be ascertained from touch sensor 302. Next, in order to establish the interpretation to be applied to these values, at step 616 the operating program of controlling device 100 may determine if touch pad input is currently to be interpreted as digit entry or as navigation entry. If navigation entry is the current operational mode, then at step 618 the reported X,Y coordinates may be interpreted according to a five zone model 506 illustrated in FIG. 5. By way of example, without limitation, if the X and Y coordinates are each reported as a linear value in the range 0 to 15 with origin 0,0 at the bottom left corner of touchpad 302, then an exemplary algorithm as presented in Table 1 below may be applied to resolve the reported coordinate data into one of the five zones and thereby determine the requested appliance navigation command function.

TABLE 1

| | | Reported X value | | |
|---|---|---|---|---|
| | | 0-4 | 5-10 | 11-15 |
| Reported Y value | 11-15 | (Y-11) > X: UP (Y-11) < X: LEFT | UP | Y > X: UP Y < X: RIGHT |
| | 5-10 | LEFT | SEL | RIGHT |
| | 0-4 | Y > X: LEFT Y < X: DOWN | DOWN | Y > (X-11): RIGHT Y < (X-11): DOWN |

For example, with reference to the bottom row of Table 1, i.e., when reported Y coordinate is in the range 0 through 4:
If X is in the range 0 through 4, then
If Y is greater than X, command equals "left arrow"
else
If Y is less than X, command equals "down arrow"
else
If X is in the range 5 through 10, then command equals "down arrow"
else
If X is in the range 11 through 15, then
If Y is greater than (X-11), command equals "right arrow"
else
If Y is less than (X-11), command equals "down arrow".

As will be evident from an examination of Table 1, similar algorithms may be symmetrically applied to the other possible ranges of X and Y to resolve these values as locations within the five zone pattern 506 of FIG. 5 and generate command transmissions accordingly.

If however, the operating program of controlling device 100 determines at step 616 that digit, i.e., numeric key, entry is the current operational mode, then at step 620 the reported X,Y coordinates may be interpreted according to the twelve zone model 520 illustrated in FIG. 5. Assuming the same range of coordinate values as presented in the previous example, an algorithm as represented in Table 2 below may be applied to resolve the reported coordinate data into one of the twelve zones and thereby determine the requested appliance digit keypad command function.

TABLE 2

| | | Reported X value | | |
|---|---|---|---|---|
| | | 0-5 | 5-10 | 11-15 |
| Reportted Y value | 12-15 | 1 | 2 | 3 |
| | 8-11 | 4 | 5 | 6 |
| | 4-7 | 7 | 8 | 9 |
| | 0-3 | — | 0 | Enter |

After determining the requested appliance command function in the manner described above, at step 622 the operating program of controlling device 100 may transmit the indicated command to the target appliance. In certain embodiments, actuation of the numeric "Enter" key 408 may be defined to also cause controlling device 100 to exit the digit entry mode. In such embodiments, at step 624 it may be determined if the command just issued was "Enter" in which case processing continues at step 608 in order to clear the digit entry mode status, whereafter processing of the key matrix input is complete.

Figure 7:
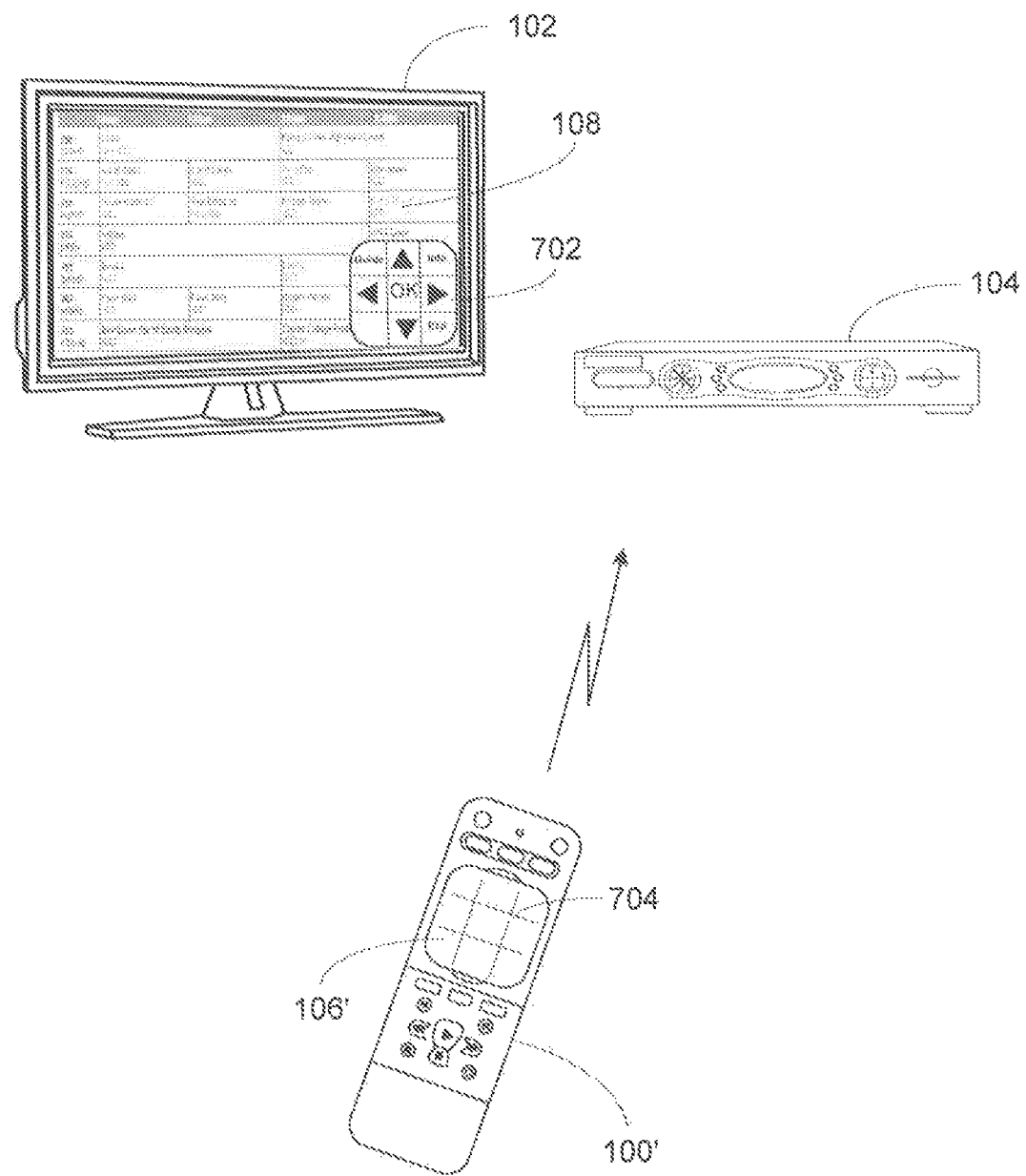
FIG. 7 illustrates an alternate embodiment of a controlling device and system in which the teachings of the instant invention may be used.

Turning now to FIG. 7, an alternative exemplary embodiment of a controlling device 100' utilizing a floating touch sensor 106' in accordance with the instant invention is presented. In this embodiment, upon actuation of one or more of silicon keypad keys 310 through 313, the operating program of controlling device 100' may simply report the raw X,Y coordinates of the actuation point to an appliance, for example cable STB 104, for interpretation by that appliance. In such an embodiment cable STB 104 may for example then tailor its interpretation of the reported actuation location based upon STB 104's current mode of operation. For example, when displaying program guide information 108 on TV 102, STB 104 may interpret reported floating touch pad data as navigation commands while, when in direct channel tuning mode, STB 104 may interpret reported floating touch pad data as digit keys, scan or skip functions, etc. as appropriate. To facilitate the user interface in this environment, the floating touch pad of controlling device 100' may comprise markings 704 which serve to visually divide the touch surface into generic areas, and STB 104 may display on TV 102 a representation 702 of the current interpretation of those areas.

While various concepts have been described in detail, it will be appreciated by those skilled in the art that various modifications and alternatives to those concepts could be developed in light of the overall teachings of the disclosure. For example, while the exemplary embodiment presented above utilizes a silicon rubber keypad as an actuation element for the floating touch sensor, it will be appreciated that various other mechanisms such as metallic dome switches, micro switches, flexible leaf contacts, etc. may be successfully utilized in other embodiments.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All publications cited within this document are hereby incorporated by reference in their entirety.

What is claimed is:

1. A remote control system for remotely controlling one or more devices and/or a user interface, the remote control system comprising:
a remote control comprising:
a plurality of user input buttons, including a first user input button and a second user input button separate and distinct from the first user input button, the second user input button configured to receive a user input event and comprising at least one metal dome and a printed circuit board and the first user input button configured to be activatable to place the remote control into at least one of a first operating mode and a second operating mode;
a touch sensor being coupled to the second user input button, the touch sensor configured to generate a sensor data in response to a user input event being received at the second user input button, the sensor data indicating a touch location on a surface of the second user input button; and
user input event detection logic configured to receive the sensor data and identify whether the user input event received at the second user input button was a click event, a touch event, or a gesture event, wherein the user input event detection logic identifies that the user input event is the click event based on receiving a further data indicating the at least one metal dome is depressed such that the at least one metal dome forms an electrical connection on the printed circuit board; and
command selection logic configured to cause, in both the first and second operating modes, a first control command of one of a first type or a second type to be executed in response to identifying that the user input event received at the second user input button was the click event, to cause, in only the second operating mode, a second control command of the second type to be executed in response to identifying that the user input event received at the second user input button was the touch event, and to cause, in only the second operating mode, a third control command of the second type to be executed in response to identifying that the user input event received at the second user input button was the gesture event;
wherein an activation state of the first user input is used to select the one of the first type and the second type and the sensor data is used to select the first control command of the selected one of the first type and second type for execution by the command selection logic.

2. The remote control system of claim 1, wherein the command selection logic comprises part of the remote control.

3. The remote control system of claim 1, wherein the second user input button is a click pad having a plurality of metal domes.

4. The remote control system of claim 1, further comprising remote control user customization logic, the remote control user customization logic being configured to enable the user to selectively map different control commands of a plurality of control commands to different user input events.

5. The remote control system of claim 1, wherein control commands of the plurality of control commands are executable through interaction with a graphical user interface associated with the remote control displayed on a screen associated with a device in communication with the remote control system.

* * * * *